United States Patent [19]

Ramos et al.

[11] Patent Number: 4,767,636

[45] Date of Patent: Aug. 30, 1988

[54] METHOD FOR ADHERING SPICES ON THE SURFACE OF RICE

[75] Inventors: Hector V. Ramos, Cranbury; Kenneth W. Fagan, Jr., Mt. Holly; Joan R. Rothenberg, East Windsor; David L. Smith, Trenton, all of N.J.

[73] Assignee: General Foods Corporation, White Plains, N.Y.

[21] Appl. No.: 915,169

[22] Filed: Oct. 3, 1986

[51] Int. Cl.$^4$ .............................................. A23L 1/36
[52] U.S. Cl. ..................................... 426/291; 426/93; 426/293; 426/295
[58] Field of Search .................... 426/93, 96, 99, 291, 426/292, 293

[56] References Cited

U.S. PATENT DOCUMENTS

| | | | |
|---|---|---|---|
| 2,440,604 | 4/1948 | Harrel et al. | 426/99 |
| 3,652,299 | 3/1972 | Penton | 426/99 |
| 3,666,491 | 5/1972 | Touba | 426/99 |
| 3,879,566 | 4/1975 | Cox et al. | 426/309 |
| 4,530,848 | 7/1985 | Bannon et al. | 426/293 |

FOREIGN PATENT DOCUMENTS 122740  3/1976  Japan .................................... 426/93

*Primary Examiner*—Donald E. Czaja
*Assistant Examiner*—Mary S. Mims
*Attorney, Agent, or Firm*—Sam D. Walker; Thomas R. Savoie; Daniel J. Donovan

[57] ABSTRACT

The present invention is concerned with a continuous process for preparing a non-segregating, free-flowing dried instant rice and sauce dish comprising coating rice in a rotating coating reel with a layer of oil followed by contacting the coating rice with dry ingredients then applying a second layer of oil and finally adding vegetable inlays prior to packaging.

6 Claims, No Drawings

METHOD FOR ADHERING SPICES ON THE SURFACE OF RICE

FIELD OF THE INVENTION

The present invention is concerned with a process for producing an instant rice and sauce dish. More particularly, the present invention is concerned with a process for adhering a powder spice/flavor blend to the surface of rice so that a sauce will form upon cooking with water and the packaged product will have portion controlled features.

BACKGROUND OF THE INVENTION

Food processors desire to package their food products in a manner compatable with the broadest range of consumer needs. Consumers, on the other hand, require the freedom to choose their own serving size. Consequently, foodstuffs are packaged to optimize the consumer's choice of serving sizes whenever practical. However, free-flowing mixtures of different size and density particles segregate after packaging, thereby restricting the feasible serving sizes to one: the entire package. Generally, the art has corrected this problem by agglomerating the segregating mixture to produce a non-segregating mixture.

In the past, foods have been agglomerated by a variety of methods, including: steaming and contacting the moistened food particles; moistening and pressing the food partciles together, U.S. Pat. No. 518,891 issud to Manwaring; and blending a solid food or foods with an aqueous or an aqueous miscible fluid, U.S. Pat. No. 3,100,909 issued to Schapiro. However, the structure of some foodstuffs, e.g., bread crumbs, collapses at intermediate and high moistures when agitated, thus precluding the use of agglomeration methods wherein the foodstuff is moistened to these levels. Consequently, Hege, U.S. Pat. No. 3,987,138, developed a low moisture method of agglomeration. Hege teaches the use of a small amount of water dispersed in a large volume of a nonmiscible, inert, liquid carrier to lightly moisten the food. However, this procedure, may leave an unacceptable residue of the nonmiscible, inert, liquid carrier in the food.

Block et al., U.S. Pat. No. 3,409,442, teaches a procedure that produces a single particle by aggregating dry ingredients with a foamed, edible binder. According to the Block et al. disclosure, the foam and not the dry ingredients, provides the agglomerated particle with its structure. Furthermore, the Block et al. teaching directs the production of a perceptually moist product. Consequently, Block et al. disclose that the foaming agent should constitute only about 2% of the foam and that the foam overrun is limited to between 150 to 250%. In the Block et al. process, the foam moistens, agglomerates, and provides the framework for the dry ingredients.

U.S. Pat. No. 4,476,145 by Hardie-Muncy et al. discloses a means for agglomerating food material whose structure is moisture sensative and colapses upon exposure to the moisture levels used in traditional agglomeration methods. This is accomplished in Hardie-Muncy by dissolving a hydrophylic binding agent in water and whipping to form a high overrun form. The foam is then coated on to the moisture sensative material followed by the addition of the other ingredients. Further, U.S. Pat. No. 4,530,848 by Bannon et al. accomplishes the same end by coating oil onto the surface of a moisture sensative material such as specifically sized bread crumbs then distributing a powdered seasoning over the oil coated crumbs. The oil causes the powdered seasoning to aggregate on the surface of the bread crumbs. The resulting product can be prepared in a single hydration step, and any desired serving size can be easily prepared from a bulk packaged product.

It is, therefore, an object of the present invention to prepare a portion-controlled rice product.

A further object of the present invention is a process for agglomerating rice and other food materials.

Another object of the present invention is a process for preparing a non-segregating, free-flowing dehydrated rice product.

SUMMARY OF THE INVENTION

The present invention is concerned with a continous process for preparing a non-segregating, free-flowing, dry instant rice and sauce dish comprising: conveying rice to a rotating coating reel, coating the rice with oil in amounts ranging from 3.0 to 6.5% by weight, contacting the oil coated rice with dry ingredients, applying a second layer of oil to the rice coated with dry ingredients in amounts ranging from 3.0 to 6.5% by weight, and applying a third layer of oil to the oil coated rice in amounts ranging from 3.0 to 6.5% all by weight of the uncoated rice.

DETAILED DESCRIPTION

The present invention is concerned with the production of a non-segregating, free-flowing and dehydrated instant rice product which can be quickly prepared by the consumer in a one-step process. This invention will be further described in terms of manufacture of a rice product which includes rice, dry spices and/or flavoring and dried vegetables.

In the present invention, parboiled rice at a predetermined flow rate of about 1,000 to 4,000 lbs./hour is fed to a coating reel which is rotating at about 5 to 9 revolutions per minute. Rotation enhances even distribution of added oil and dry ingredients about the surface of the rice and further prevents the rice particles from sticking together. To promote continuous movement of the rice through the rotating coating reel, said coating reel is positioned at an angle ranging from 10° to 30° from the horizontal.

A partially hydrogenated vegetable oil is then sprayed onto the rice at a rate ranging from 30 to 40 lbs/hr to a level of from to 3.0% to 6.5% by weight of the rice. Typically, oil is applied to the tumbling rice through a plurality of spray nozzles so that an essentially uniform oil coating is produced on all of the rice kernels.

The nozzles through which the oil is applied in the present invention is located on the inside of the coating reel, with each nozzle spaced about one foot apart. The oil is pumped from a holding tank at about 10 to 30 psig to the nozzles. A pressure drop of about 40 to 100 psig is developed across each nozzle. Further, about 10 to 20 psig of air pressure is required to create an atomized hollow cone spray pattern of about 5 to 8 inches in diameter. These nozzles must be pointed to ensure that the atomized oil is deposited on the product.

The dry ingredients containing a mixture of salt, sugar, spices, flavoring materials, coloring materials and the like and combinations thereof are then contacted with the oil coated rice in a manner which will effect uniform distribution of the dry ingredients onto the surface of the oil coated rice kernel. The dry ingredients will be dispersed by feeding said ingredients from a loss-in-weight feeder to a 10 feet auger feeder located inside the coating reel next to the spraying system. The dry ingredients are applied through the 10 feet auger at a distance up to and not exceeding one-half the length of the coating reel, so that the dry ingredients will be typically distributed across the entire width of the moving oil coated rice kernels. During addition, continuous agitation is necessary to ensure that the oil coated rice is covered in its entirety with the dry ingredients. The amount of dry ingredients which is utilized may vary over wide ranges, but will typically be between 5% and 20% by weight of the rice (uncoated).

Once the rice becomes coated with dry ingredients in its entirety, a second layer of oil is coated onto the rice. This is accomplished by a second set of spray nozzles located 6 feet from the inlet within the mixer. Agitation is also essential to ensure a uniform oil coat. The purpose of the second oil layer is to ensure good adhesion of the dry ingredients. This results in a layer of oil totally surrounding the uniform dry ingredients coated rice, preventing said dry ingredients from falling off during subsequent processing. The oil is coated onto the rice coated with dry ingredients at a rate ranging from 30 to 40 lbs/hr to a level of from 3.0 to 6.5% by weight of the rice.

Prior to the addition of vegetable inlays, a third layer of fat is coated onto the rice kernel at the same rate and in the same amounts as the first and second layers, to ensure good adhesion of the vegetable inlays.

After the third layer of oil is evenly applied throughout the surface of the rice kernels, the vegetable inlays are added to the tumbling mixer. This is accomplished in a continuous manner by way of a long vibratory pan which is inserted after the third spray nozzles. The vegetable inlays will preferably have a particle size and density comparable to that of the rice kernels. Suitable cutting and sizing techniques will be employed so that essentially all of the vegetable pieces have a maximum dimension of between ⅜" and ⅜"×¼". In this manner the vegetable pieces and rice will be less likely to segregate either during handling, packaging or distribution of the packaged product. The vegetable pieces will typically be added at a level from 0.25% to 14.50% by weight of the rice. Dieced and dried celery, carrots, onions and the like may be included depending on the desired final product.

Since the product of the present invention is designed to be prepared by the consumer in a single step (i.e., single hydration step), the dried vegetables must be hydrated at essentially the same rate as the rice kernels/dry ingredient aggregate. As will be appreciated by those skilled in the art, both the oil coating and the adhered dry blend will tend to retard hydration of the rice; however, it will still be necessary to employ dried vegetable pieces which hydrate faster than conventional air dried vegetables. Freeze-dried vegetables and/or puffed dried vegetables will be suitable for use in this invention.

The finished product is fed from the reel onto a belt conveyor for packaging.

The following examples will further illustrate the features of the present invention.

EXAMPLE 1

A flow rate of 717.7 lbs/hour of Parboiled rice was fed to a coating reel. At the time of addition the coating reel was rotating at 6 RPM and positioned at an angle of 25° from the horizontal. The rice was fed gravimetrically from a hopper onto a belt feeder then onto a vibratory pan which delivers the rice into the reel. A bed of about 3 inches was allowed to be formed in the reel before the oil was added. Oil (at room temperature) was then applied to the rice at a rate of 36.1 lbs./hr. or 12 lbs./hr./nozzle.

The oil was pumped from a holding tank at about 50 psig to a set of three two-fluid nozzles which were spaced about 1 foot apart in the center of the dryer. About 15 psig of air pressure was required with the oil spray to create an atomized hollow cone spray pattern of 8 inches in diameter. The nozzles were positioned so that the atomized oil was sprayed directly onto the tumbling product.

The dry ingredients (spice mix) were fed from a loss-in-weight auger feeder to a 10 feet auger feeder at a rate 115.3 lbs/hr. The spice mix was fed to the oil coated tumbling rice up to the center (length) of the coating reel.

Two additional layers of oil were coated onto the rice, coated with dry ingredients sequentially at the rate disclosed above. After the third layer of oil was applied, vegetables were added. The vegetables were fed to the mixer through an inlet located 1.5 feet from the outlet of the mixer. The vegetables were fed at a rates which varied with the particular vegetable. Orzo was fed at 95.3 lbs./hr.; onions at 22.9 lbs./hr.; dried mushrooms at 10.2 lbs./hr. and parsley at 2.5 lbs./hr. respectively.

The finished product was fed from the reel onto a belt conveyer at a rate of 1000 lbs./hr to be packed.

What is claimed is:

1. A continuous process for preparing a non-segregating, free-flowing, dried instant rice and sauce dish comprising the steps of:
   (a) conveying dried instant rice to a coating reel rotating at from 5 to 9 revolutions per minute at a rate of 1,000 to 4,000 lbs./hr. and wherein said coating reel is positioned at an angle ranging from 10° to 30° from the horizontal;
   (b) coating the rice with oil to levels ranging from 6.5% to 30% by weight of the rice;
   (c) coating the oil coated rice with dry sauce producing ingredients in amounts ranging from 5% to 20% by weight of the rice;
   (d) applying a second coat of oil to the rice coated with dry ingredient to levels ranging from 3.0% to 6.5% by weight of the rice; and
   (e) applying a third coat of oil to the oil coated rice of step (d) to levels ranging from 3.0% to 6.5% by weight of the rice.

2. A process according to claim 1 wherein the oil is sprayed onto the rice at a rate ranging from 30 to 40 lbs/hr.

3. A process according to claim 1 further comprising the addition of vegetable inlays to the oil coated rice after the third oil coating step.

4. A process according to claim 1 wherein the dry ingredient is a member selected from a group consisting of salt, sugar, spices, flavoring material, coloring materials and combinations thereof.

5. A process according to claim 3 wherein the vegetable inlays are a member selected from a group consisting of orzo, onions, mushrooms, parsley and combinations thereof.

6. A process according to claim 2 wherein the vegetable inlays are added after the third oil coating step in amounts ranging from 0.25% to 14.50% by weight.

* * * * *